Figure 1:
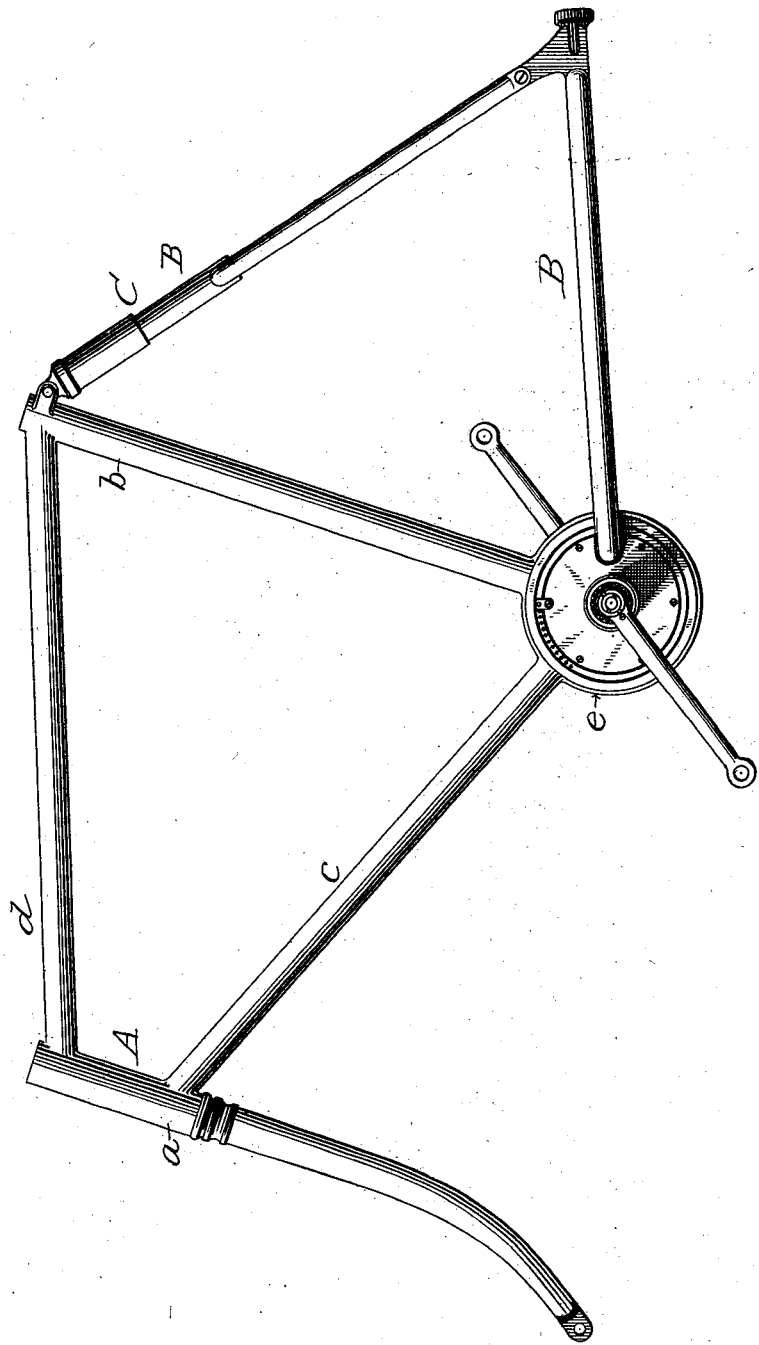

No. 747,789. PATENTED DEC. 22, 1903.
L. B. SOMERBY.
BICYCLE OR LIKE VEHICLE.
APPLICATION FILED SEPT. 9, 1899.
NO MODEL. 4 SHEETS—SHEET 1.

Witnesses
Inventor:
Lorenzo B. Somerby
by Dodge & Sons
Attorneys.

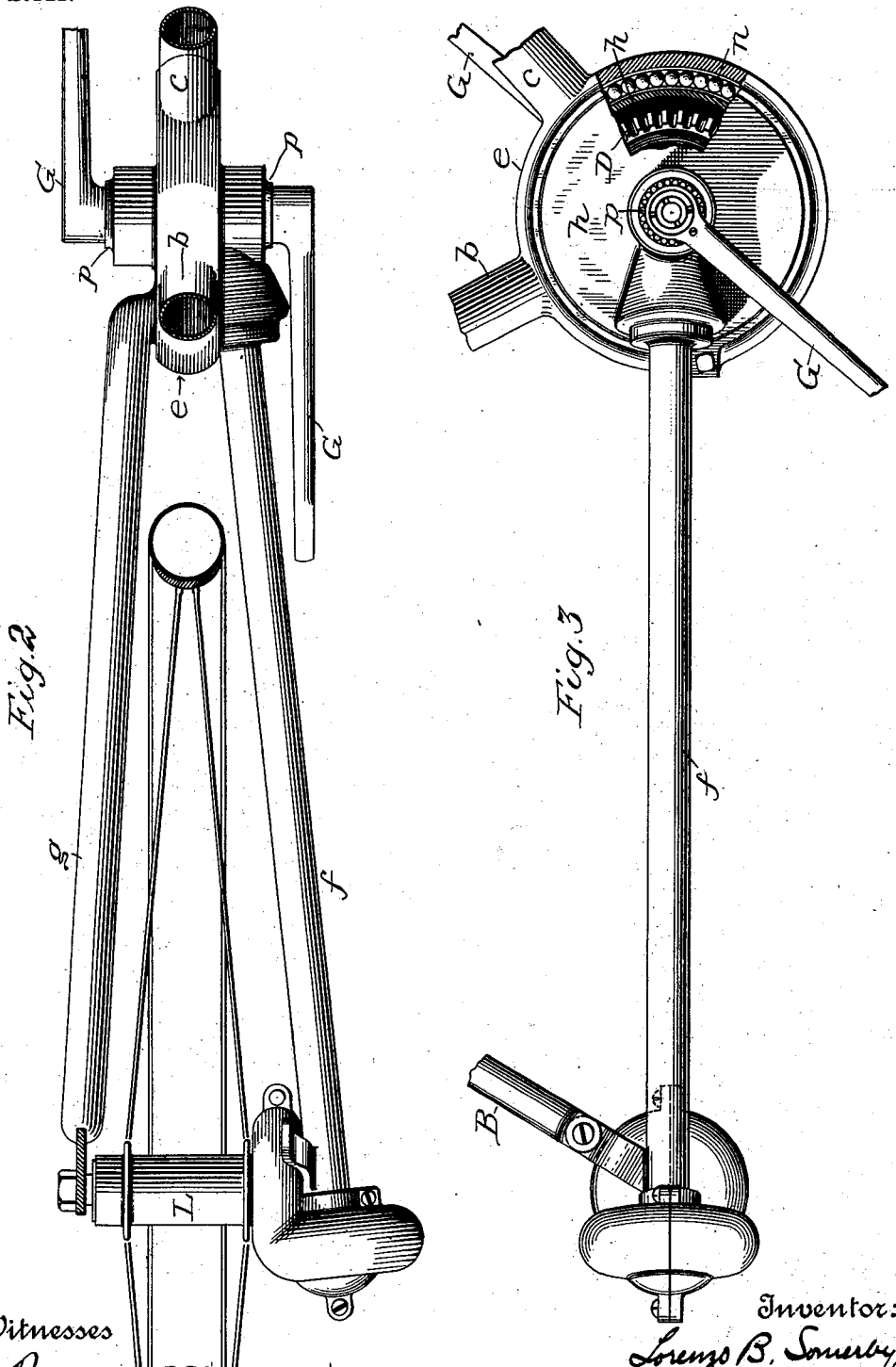

No. 747,789. PATENTED DEC. 22, 1903.
L. B. SOMERBY.
BICYCLE OR LIKE VEHICLE.
APPLICATION FILED SEPT. 9, 1899.
NO MODEL. 4 SHEETS—SHEET 3.
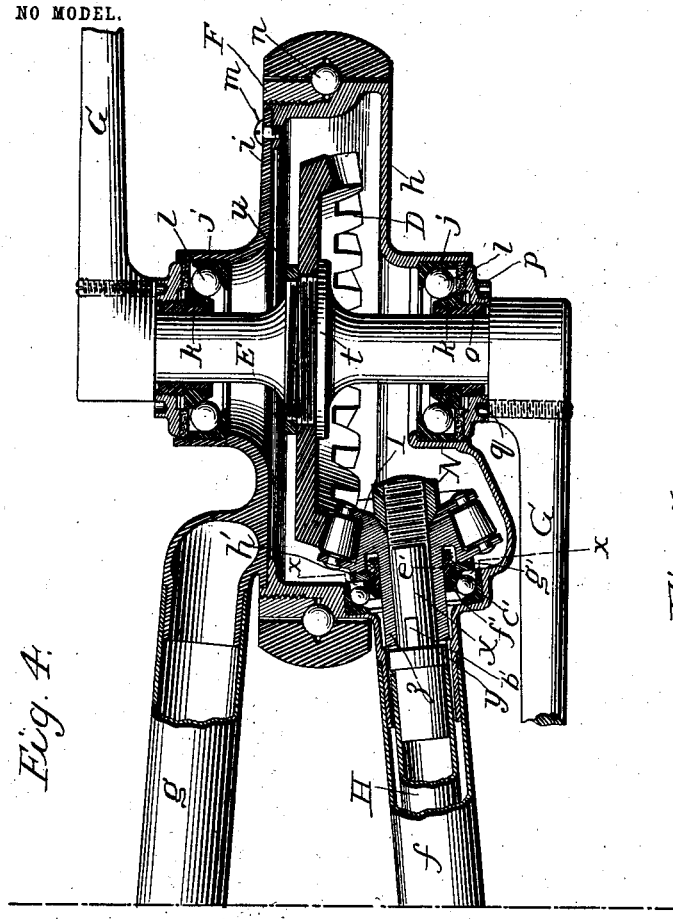
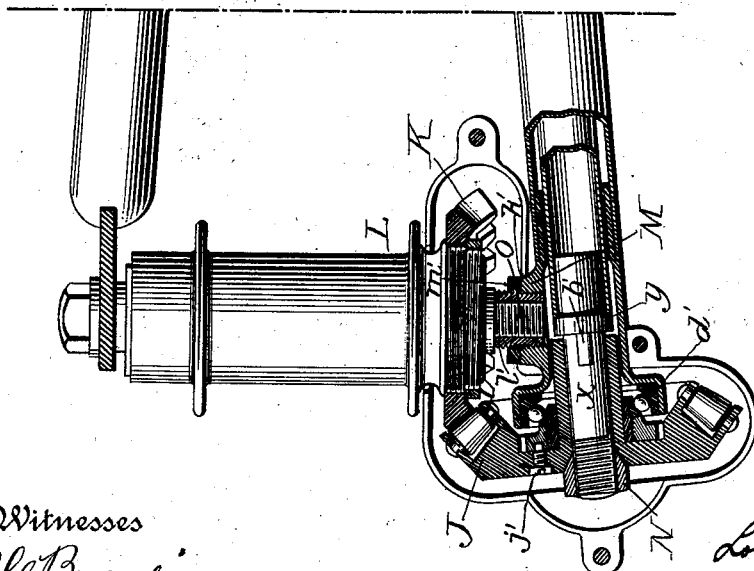
Witnesses
All Burdine
D. E. Burdine
Inventor:
Lorenzo B. Somerby,
by Dodge Sons,
Attorneys.

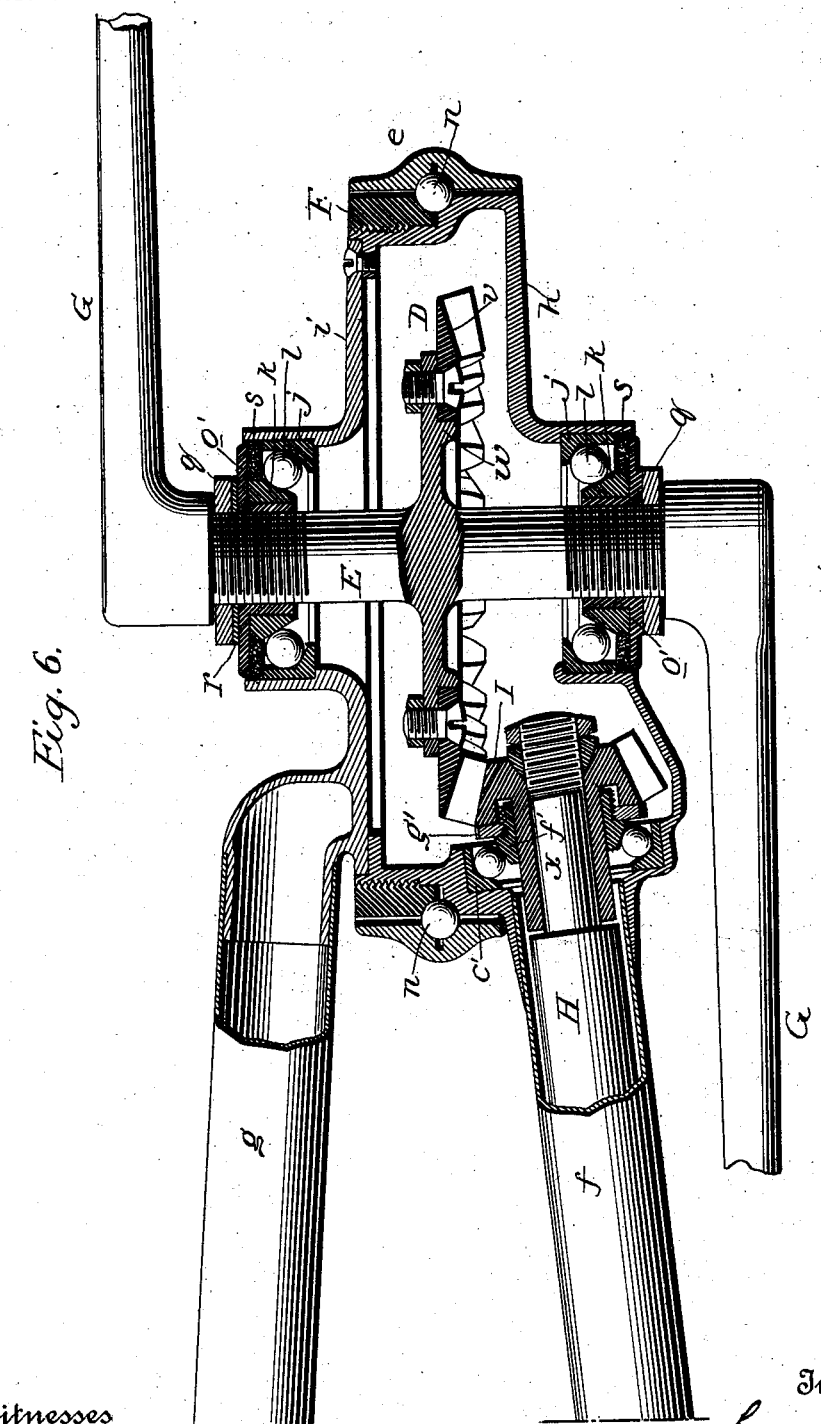

No. 747,789. Patented December 22, 1903.

UNITED STATES PATENT OFFICE.

LORENZO B. SOMERBY, OF BUFFALO, NEW YORK, ASSIGNOR TO THE GEORGE N. PIERCE COMPANY, OF BUFFALO, NEW YORK.

BICYCLE OR LIKE VEHICLE.

SPECIFICATION forming part of Letters Patent No. 747,789, dated December 22, 1903.

Application filed September 9, 1899. Serial No. 729,947. (No model.)

*To all whom it may concern:*

Be it known that I, LORENZO B. SOMERBY, a citizen of the United States, residing at Buffalo, in the county of Erie and State of New York, have invented certain new and useful Improvements in Bicycles or Like Vehicles, of which the following is a specification.

My invention pertains to bicycles and like vehicles, and has reference more particularly to the construction of the frame, whereby it is adapted to receive toothed driving-gear and to permit a yielding action of one part relatively to the other for the purpose of absorbing the shock, jar, or vibration incident to riding over rough roads.

The invention is susceptible of more or less variation as to its embodiment, a preferred form being here adopted for purposes of illustration and explanation.

In the drawings accompanying this description, Figure 1 is a side elevation of the improved frame, showing its general outline, the gear casing or shell at the pedal-shaft, and the yielding or telescopic brace; Fig. 2, a top plan view of the rear fork, main gear shell or case, pedal-shaft, and cranks; Fig. 3, a side elevation of said parts looking from the driving side of the machine, a portion of the main gear shell or casing being broken away to show interior construction. Fig. 4 is a top plan view of the rear fork and parts carried thereby, the main gear shell or casing, and pedal-shaft, portions being shown in section to better illustrate construction of parts; Fig. 5, a cross-section on line *x x* of Fig. 4, showing the mode of adjusting and securing the cone of the driven pinion at the fore end of the transmitting-shaft; Fig. 6, a view similar to Fig. 4, but showing a modified form of driving-gear and different adjusting devices for the pedal-shaft cones; Fig. 7, a view showing another modification.

In the construction of bicycles various desirable features have been brought forward, among others the substituting of toothed or intermeshing gear-wheels for the more common chain-and-sprocket wheels and the introduction of a joint between the front and rear frame or frame-sections and the provision of an elastic brace or yielding support to maintain the sections in proper relation, while permitting a limited amount of play or relative movement. It has for some time past been deemed desirable to combine these two features of construction in one and the same machine, and various constructions have been brought forward with this end in view. The present invention is in the same direction and is deemed to meet the requirements of the situation in a peculiarly advantageous manner both from the builder's and from the rider's standpoint.

The usual rigid bicycle-frame has at or near the lower end of the saddle-post tube a transverse shell or short tube built into the frame and adapted to receive the ball-races for the pedal-shaft. Under the present construction the races, cones, and attendant parts are carried in the walls of the main gear shell or casing, which in turn is mounted or swiveled to rock or turn in a vertical plane in a large ring or hoop built into the front frame or frame-section at or about the point at which the pedal-shaft barrel or hanger has hitherto commonly been located. The main gear shell or casing is formed as a part of a rear frame or frame-section, and hence all the parts of the driving-gear requiring nice adjustment can be assembled, adjusted, and, if need be, ground to proper bearing before connecting the rear frame with the main or front frame, such connection being subsequently made without disturbing or destroying the accurate adjustments thus effected.

Referring now to the drawings and first to Fig. 1, the frame will be seen to consist of a main trapezoidal front section A and a rear fork or section B, the latter jointed at its forward end to the main frame and connected therewith at its rear end by a telescopic spring-brace C. The main or front frame-section comprises the steering-head *a*, saddle-post tube *b*, perch or reach *c*, and horizontal member or strut *d*, all preferably made of tubing welded, brazed, soldered, or mechanically fastened at their points of union, as usual. The saddle-post tube *b* and perch or reach *c* are not directly joined one to the other, but are both united to a large hoop, ring, or annular bearing *e*, within which is swiveled the main gear shell or casing, hereinafter described. In other respects the main frame is or may be of ordinary construction.

The rear frame-section or fork B comprises two side bars $f$ and $g$, the former provided at its forward end with an annular shell $h$, which forms the body of the main gear shell or casing, and the latter provided with a disk $i$, which constitutes a cover for said casing. The annular shell $h$ is of such internal diameter as to accommodate readily a large bevel gear or other toothed wheel D, formed with or secured to a pedal-shaft E, which latter is carried in suitable bearings supported by and concentric with the gear-casing and its cover. These bearings are preferably of the ball type, comprising races $j$, seated in shouldered sockets formed in necks or lateral tubular extensions of the shell and cover, cones $k$, encircling the pedal-shaft E, and balls $l$, interposed between the races and cones.

The cover $i$ is made fast to the annular shell or casing $h$ by screws $m$, tap-bolts, or other convenient fastenings, so that the two members $f$ and $g$ thus connected constitute a rigid fork analogous in its general form and features to the rear fork of an ordinary bicycle except that it is separate and distinct from the main or front frame-section.

For the purpose of uniting the front and rear frame-sections, maintaining them in proper relation, and permitting a relative movement of said sections about the axis of the pedal-shaft, the ring or hoop $e$ is interiorly grooved to receive a set of balls $n$, and the shell $h$ is circumferentially shouldered, grooved to afford a partial seat or bearing for the balls, and externally threaded on its smaller portion to receive a large nut or ring F, which completes the bearing or seat for the balls $n$ and by confining them between the outer hoop or ring $e$ and the shell or casing $h$ locks said parts together, though permitting free rotary movement of one relatively to the other about their common axis.

The races $j$ are seated in the lateral necks of the shell or casing $h$ and its cover $i$, as above mentioned, and they remain fixed in position.

The cones $k$ may be adjusted in different ways, one of which is illustrated in Fig. 4 and others in Figs. 6 and 7. Referring first to Fig. 4, it will be seen that the pedal-shaft E is encircled near each end or outside of and beyond the races $j$ by an externally-threaded sleeve $o$, the inner end of which is reduced to form a neck and bearing-shoulder for a cone $k$. Encircling and screwing upon the sleeve $o$ is a nut $p$, the outer face of which bears against the boss or hub of crank-arm G. If the nut be turned in direction to unscrew or back off from the sleeve $p$, being itself prevented by the crank from receding, it will force the sleeve forward or inward, carrying with it the cone $k$ and tightening the bearing at that end of the pedal-shaft, the shaft being prevented by a similar bearing at the opposite end from moving longitudinally. The sleeve $o$ may be splined or feathered upon the shaft to prevent it from rotating thereon while the nut $p$ is being turned, and the nut is held at any desired adjustment by a screw-pin $q$, passing through a hole tapped in the crank boss or hub, the end of the pin entering one or another socket in the nut, as shown in Fig. 4. By backing the cone and advancing the other the pedal-shaft may be adjusted longitudinally to the limited extent required to insure the precise depth of engagement of the gear-teeth necessary to their most efficient action. In Fig. 6 the construction is somewhat similar, but the cone bearing-sleeves $o'$ are made in the form of nuts and screwed directly upon the pedal-shaft, being backed up by lock-nuts or jam-nuts $q$, as shown. In said Fig. 6 I have shown the usual thin metal washer $r$ between the cone-carrying nut and jam-nut, a tongue of said washer entering a slot or keyway in the shaft and the washer serving to prevent the cone-carrying nut from being turned in the act of tightening the lock-nut. Fig. 7 shows the same construction and arrangement as Figs. 4 and 5, except that the periphery of the nut is made with semicircular notches $h^2$ to receive a fastening-screw $i^2$. Under all constructions washers $s$, of felt or like compressible material, are advisably placed across spaces between the races and the cones to exclude dust and grit. They are held in place by the cone-adjusting nuts and may be made to carry lubricant, which they absorb freely and give off very gradually.

It will be noted upon referring to Figs. 4 and 6 that the interior space or opening of casing $h$ is of a diameter greater than that of the gear-wheel D, which latter may therefore be freely inserted and removed through its open side when the cover plate or disk $i$ is removed. This gear-wheel, which may be of the ordinary bevel form or of any of the various roller-tooth types, may be formed integral with the pedal-shaft in whole or in part or made separate and secured thereto in any convenient way, two forms being shown—one in Fig. 4 and another in Fig. 6.

First explaining the construction shown in Fig. 4, it will be seen that the pedal-shaft is there represented as enlarged in diameter at or near its mid-length, the enlarged portion being stepped or made of differing diameters. The smaller section is threaded in one direction, the next section is threaded in the reverse direction, and the largest portion, in the form of a radial disk, constitutes a stop-shoulder or abutment. The gear-wheel D has a central eye tapped or threaded to screw upon the larger threaded portion of the pedal-shaft. It is screwed thereon until its face bears firmly against the side face of the disk $t$, after which a binding-nut $u$ is screwed upon the smaller threaded portion of the pedal-shaft until it bears firmly against the rear face of the gear-wheel D, thus serving to prevent the latter from unscrewing or becoming loosened. It is of the utmost importance that this result be perfectly attained, and it is for this reason that the threads are reversed for the wheel and the binding-nut, so that if one loosens the least bit it shall cause the other to tighten correspondingly. By varying the diameters of the two threaded sections this result is more perfectly assured than it otherwise would be. The wheel is tapped and the shaft is threaded in a direction to cause the wheel to bind more tightly when the driving power is applied to the pedal-shaft, or, in other words, a right-hand thread is employed when the driving-pinion is applied from the left-hand side and screwed against a shoulder toward the right-hand side of the machine, and vice versa.

Instead of the above-described mode of applying the gear-wheel D it may be made integral with the pedal-shaft; but as it is comparatively difficult to cut the gear-teeth under such arrangement and as no change of gear could be made without change of pedal-shaft I prefer to make only the body or radial disk of the gear integral with the shaft and to form the teeth in or upon an annular plate or a ring $v$, which, encircling a raised flange or shoulder $w$, formed on the side face of the disk or body of the gear and secured thereto by screws or tap-bolts, is at once accurately centered and firmly secured in place. In this, as in the previously-described form, the gear-wheel may be of any preferred type with rigid teeth or with rollers, as preferred.

The wheel D is designed to give motion through a suitable transmitting-shaft H to the rear wheel of the bicycle or other vehicle. It is very desirable that this driving-wheel be located as near the medial plane of the machine as practicable for various reasons, and this object I fully attain by the construction set forth, at the same time securing a narrow tread or short pedal-shaft and producing a peculiarly symmetrical and well-proportioned structure. So, too, the rear fork takes practically the usual lines and proportions of that of the common chain-driven machine.

The transmitting-shaft H is by preference made of tubular form to combine lightness and strength and is carried longitudinally through the side bar $f$ of the rear frame or fork, but is of a diameter to leave clearance between its circumference and the interior of said bar. Each end of the shaft is furnished with a solid stem or end piece $x$, brazed, welded, or otherwise firmly united with it, each stem being provided with reduced portions separated by a collar $y$, the collar being preferably of the same diameter as the shaft H and abutting against the end thereof to determine accurately the position of the stem, while the reduced portions serve, respectively, to enter, fill, and stiffen the end of the shaft and to receive a pinion forming part of the transmitting-gear. Figs. 4 and 6 show the pinion I at the forward end of shaft H, and Fig. 4 shows also the pinion J at the rear end of said shaft, the latter meshing with a pinion K, formed upon or secured to the hub L of the rear ground-wheel. To attach the pinions firmly to the shaft H, yet permit their ready removal and replacement, each pinion is formed with a somewhat extended tubular neck $z$ on the side or face nearest the collar $y$ of its stem $x$, and the end of said neck is provided with a notch or notches $a'$ to receive a lug or lugs $b'$, formed on the stem $x$, as best shown in Fig. 5. A nut N, preferably of conical form, screwed upon the end of stem $x$, maintains the pinion in position.

To properly locate and support the pinions I J and their shaft H, I employ ball-bearings, essentially like those provided for the pedal-shaft. The races $c'$ and $d'$ of these bearings are seated in circular sockets or depressions formed, respectively, in a lateral swell or enlargement of the annular shell or casing $h$, to a neck of which the side bar $f$ is brazed, welded, or otherwise united, and in a fitting M, similarly joined to the rear end of said side bar or formed therewith.

To afford proper adjustment of the cones of the pinion or shaft bearings, I adopt practically the same construction shown in connection with the pedal-shaft bearings in Fig. 4—that is to say, the neck $z$ of each pinion is encircled by a sleeve or collar $e'$, bearing a cone $f'$, and is externally threaded to receive an adjusting-nut $g'$, the back face of which bears against the body of the pinion, as plainly shown in Figs. 4 and 6. The cone-carrying collar will advisably be splined or otherwise guided upon the sleeve $x$ and held against turning thereon.

In Fig. 5 I have represented the nut $g'$ as provided with a series of peripheral notches $h'$ to receive the nose of a holding spring or detent $i'$, by which it is held against accidental turning, the spring or detent being attached to the pinion I.

Fig 4 shows a screw-pin $j'$ for holding the nut $g'$ after the manner of screw-pins $q$ of said figure employed to hold nuts $p$ of the pedal-shaft bearings.

It is important to provide for nice adjustment of the rear-wheel axle relatively to side bar $f$, to the end that the pinions J and K may have precisely the proper depth of engagement or mesh. Hence the fitting M is formed with a boss $k'$ on its inner side, which is tapped to receive a nipple $l'$, which in turn is tapped to receive the threaded end of the rear-wheel axle O. The nipple $l'$ may be adjusted to protrude more or less from or beyond the side of the fitting M, and being held at its proper adjustment by a jam-nut $m'$ it forms an abutment and a limiting-stop for the shouldered and threaded end of the axle O, and consequently determines the mesh of the pinions. A similar result may be attained by adjusting the cone-bearings of the wheel itself; but this is more difficult, and hence less satisfactory.

The side bar g is or may be provided with the customary slotted tang to receive the opposite end of axle O, and a casing of convenient form and construction incloses the pinions J and K.

Having thus described my invention, I claim—

1. A bicycle-frame, comprising a rigid front section provided with a hoop or ring adapted to receive within it a gear shell or casing; a detachable rear fork or section having a gear shell or casing adapted to fit within said hoop or ring; and a driving-gear arranged within said gear-shell, the parts being connected substantially as set forth.

2. In combination with a front frame for bicycles, comprising a steering-head, a saddle-post tube, a perch or reach, a strut or brace connecting the steering-head and saddle-post tube, and a hoop or ring located at the junction of the perch or reach and saddle-post tube; a rear frame having a gear-shell adapted to fit within said hoop or ring; and driving-gear contained within said shell.

3. In combination with a front frame for bicycles, comprising a steering-head a saddle-post b, reach or perch c, and ring or hoop e; a rear frame or fork having a gear-shell adapted to fit and turn within said hoop or ring; and gearing contained within said shell.

4. A bicycle-frame, comprising a front section A provided with a hoop or ring e; a rear fork or section B provided with a gear shell or casing h, the latter seated within the hoop or ring e; a driving-gear mounted within the gear shell or casing; and a yielding brace or support for the section B, whereby one section is permitted to move relatively to the other.

5. In combination with a front frame-section, having a hoop or ring; a rear fork or section, provided with a gear shell or casing; bearings carried by and concentric with said casing; a pedal-shaft mounted in said bearings; and a driving-gear carried by said shaft and arranged within the gear-shell, substantially as described.

6. In combination with a front frame-section, having a hoop or ring; a rear fork or section, having a gear shell or casing swiveled in said ring; a pedal-shaft mounted in bearings coaxial with the shell and ring; and a driving-gear carried by said pedal-shaft; the parts being combined and arranged substantially as described, whereby the pedal-shaft, the gear-shell, and the hoop or ring are given a common axis.

7. In a bicycle or like vehicle, the combination of a front frame provided with a hoop or ring; a rear frame or section having a shell or casing fitting within said hoop or ring; and balls or rollers interposed between the hoop or ring and casing and serving both to lock the parts together and to reduce friction between them.

8. In combination with a front frame or section A provided with a ring e, having an internal groove or channel, a rear frame or fork having a circular enlargement to fit within said ring and provided with a peripheral channel facing the groove of the ring; and a ring or nut screwed upon the circular enlargement of the rear section and serving to complete the groove or channel thereof and to confine therein a series of balls or rollers by which the two parts are locked together.

9. In a bicycle-frame, the combination of a front frame terminating at the rear in a seat-post tube provided with a hoop or ring at its lower end, said hoop or ring having an uninterrupted opening through it from side to side of diameter sufficient to permit the facewise or axial introduction of a circular gear shell or head of a rear frame; and a rear frame or fork having a circular gear-shell adapted to fit within said hoop or ring.

10. In a gear-driven bicycle, the combination with a suitable framing having a tubular side bar f and races c', d' at opposite ends thereof; a transmitting-shaft H extending longitudinally through said side bar; pinions carried by said shaft at opposite ends; cone-bearing sleeves mounted upon the necks or hubs of said pinions; nuts encircling said sleeves and bearing against the pinions and serving to adjust the cones; and balls interposed between the cones and races, substantially as described and shown.

11. In combination with a front frame having a hoop or ring, a rear frame, separate and distinct from the front frame, comprising a rear wheel-fork, and a shell or casing connecting the two members of the fork and having a true circular periphery exposed throughout its circumference, whereby said casing is adapted to fit and turn concentrically within the hoop or ring of the front frame.

12. In combination with a front frame-section provided with a hoop or ring, a rear fork or section provided with a circular shell or casing adapted to contain driving-gear, and to fit and turn within the hoop or ring.

13. In combination with front frame-section A having a ring or hoop e, a separate and distinct rear frame-section or fork provided with a shell or casing for driving-gear, having a removable cover or side plate to permit introduction and removal of the gearing.

14. In combination with a front frame having a hoop or ring, a rear frame-section or fork, separate and distinct from the front frame-section, having a shell or casing adapted to receive and house driving-gearing, and provided with lateral projections containing bearings for a pedal-shaft, the periphery of said shell being truly circular and completely exposed, whereby the shell is adapted to fit and turn or oscillate within the hoop or ring of the front frame.

15. In combination with the front frame-section of a bicycle or like vehicle, provided with a hoop or ring; a rear frame-section or fork, separate and distinct from the front frame-section, comprising bars or members $f$ and $g$; a gear shell or casing $h$, carried by the member $f$ and provided with a central projection or neck; a cover-plate $i$ carried by the member $g$ and likewise provided with a central projection or neck; shaft-bearings carried by said necks; and a pedal-shaft E carried by said bearings, the periphery of the gear shell or casing being truly concentric with the axis of the pedal-shaft, and fitting and free to turn within the hoop or ring of the front frame.

In testimony whereof I have signed my name to this specification in the presence of two subscribing witnesses.

LORENZO B. SOMERBY.

Witnesses:
 HENRY MAY,
 S. J. THOMPSON.